(12) United States Patent
Seewald-Raider

(10) Patent No.: US 9,908,766 B2
(45) Date of Patent: Mar. 6, 2018

(54) CONTAINER-PROCESSING MACHINE AND METHOD FOR PROCESSING CONTAINERS

(71) Applicant: KHS GmbH, Dortmund (DE)

(72) Inventor: Alex Seewald-Raider, Bad Kreuznach (DE)

(73) Assignee: KHS GmbH, Dortmund (DE)

( * ) Notice: Subject to any disclaimer, the term of this patent is extended or adjusted under 35 U.S.C. 154(b) by 0 days.

(21) Appl. No.: 15/305,844

(22) PCT Filed: Apr. 13, 2015

(86) PCT No.: PCT/EP2015/057940
§ 371 (c)(1),
(2) Date: Oct. 21, 2016

(87) PCT Pub. No.: WO2015/165721
PCT Pub. Date: Nov. 5, 2015

(65) Prior Publication Data
US 2017/0043991 A1 Feb. 16, 2017

(30) Foreign Application Priority Data

Apr. 29, 2014 (DE) .................. 10 2014 105 974

(51) Int. Cl.
| | | |
|---|---|---|
| B65G 47/84 | (2006.01) | |
| B65G 54/02 | (2006.01) | |
| B67B 3/28 | (2006.01) | |
| B67C 3/24 | (2006.01) | |
| B29C 49/42 | (2006.01) | |
| B29L 31/00 | (2006.01) | |

(52) U.S. Cl.
CPC ............ *B67C 3/244* (2013.01); *B29C 49/421* (2013.01); *B29C 49/4205* (2013.01); *B65G 47/846* (2013.01); *B65G 54/02* (2013.01); *B67B 3/28* (2013.01); *B29L 2031/7158* (2013.01); *B65G 2201/0244* (2013.01)

(58) Field of Classification Search
CPC .... B65G 47/846; B65G 54/02; B65G 47/847; B65G 47/848; B65G 2201/0244; B65G 2201/0235; B29C 49/4205; B29C 49/421; B67B 3/28; B67C 3/244; B29L 2031/7158

See application file for complete search history.

(56) References Cited

U.S. PATENT DOCUMENTS

| | | | | |
|---|---|---|---|---|
| 6,361,268 B1 * | 3/2002 | Pelrine | ................... | B65G 54/02 104/284 |
| 2011/0241265 A1 * | 10/2011 | Schmidt | .................. | B29C 49/12 264/532 |
| 2014/0202831 A1 * | 7/2014 | Varhaniovsky | ........ | B41J 3/4073 198/465.2 |

FOREIGN PATENT DOCUMENTS

| | | |
|---|---|---|
| DE | 10 2008 045 187 | 3/2010 |
| DE | 10 2011 111496 | 6/2012 |
| DE | 10 2011 085 636 | 5/2013 |

(Continued)

*Primary Examiner* — Mark A Deuble
(74) *Attorney, Agent, or Firm* — Occhiuti & Rohlicek LLP

(57) ABSTRACT

A processing station of a container-processing machine includes an electromagnetic linear drive that raises and lowers a container carrier. The linear drive includes a tubular guide element having a stack of magnets extending through it. This guide element guides the motion of a guided element that has coils. Current through these coils generates a magnetic field that interacts with the field from the tubular guide's magnets. This interaction yields a force that can raise the carrier.

17 Claims, 2 Drawing Sheets

(56) References Cited

FOREIGN PATENT DOCUMENTS

| DE | 10 2011 088588 | 6/2013 |
|----|----------------|--------|
| EP | 1 182 165 | 2/2002 |
| EP | 2 792 634 | 10/2014 |

\* cited by examiner

CONTAINER-PROCESSING MACHINE AND METHOD FOR PROCESSING CONTAINERS

RELATED APPLICATIONS

This application is the national stage, under 35 USC 371, of international application PCT/EP2015/057940, filed on Apr. 13, 2015, which claims the benefit of the Apr. 29, 2014 priority date of German application DE 102014105974.3, the contents of which are herein incorporated by reference.

FIELD OF INVENTION

The invention relates to container processing, and in particular, to raising and lowering containers in a container-processing machine.

BACKGROUND

In known container-processing machines, a rotating rotor carries processing stations on a circumference thereof. During operation, containers are raised up to a processing position for processing. After having been processed, they are then lowered away from the processing position.

To control the raising and lowering of containers, one typically relies on a control curve. Such processing machines have a control curve coupled to lifts. The lifts moving up and down in response to the shape of the control curve.

A disadvantage of this arrangement is that the control curve takes up a substantial amount of structural space at the container-processing machine. It also substantially increases the complexity of the container-processing machine. A further disadvantage is that the control curve is not easy to change. Thus, it is hard to reprogram the movement of the lifts.

SUMMARY

An object of the invention is to provide a container-processing machine that has a simplified structure and that improves on the ability to control raising and lowering of containers.

According to a first aspect, the invention relates to a container-processing machine. The container-processing machine comprises a rotor driven to rotate, at which rotor a plurality of processing stations are provided. Each processing station comprises a lift for raising and lowering the container that is to be treated. The lift comprises at least one container carrier and a guiding element in which the container carrier is guided, preferably in a sliding manner. Formed in the interior of the guiding element is an accommodating space that accommodates magnets. The guiding element can be configured in the form of a tube. In such a case, a longitudinal hole forms the accommodating space. The longitudinal axis of this hole coincides with the longitudinal axis of the guiding element. The container carrier further comprises electrical coils. These coils, together with the magnets in the guiding element, form an electromagnetic linear drive to raise and lower the container carrier. The electrical coils can in this situation be subjected to an electrical current, that, in order to move the container carrier, conduct current having a time-varying flow direction. The magnetic field thus generated interacts with the field from the magnets provided in the guiding element. This results in a force that moves the container carrier at the guiding element.

The foregoing container-processing machine according to the invention is thus substantially simplified and easier to maintain and clean than the conventional devices that rely on a control curve. The use of electromagnetic linear drives to raise and lower the container carrier avoids having to have an elaborate curve control. It also promotes a simplified format change since the format-dependent raising movement can be carried out simply by a changed actuation of the electromagnetic linear drives.

According to one exemplary embodiment, the container carrier has a guide section that, in order to cause an axial guidance of the container carrier at the guiding element, at least in sections, surrounds this guiding element. For example, the guiding section comprises an opening that, in relation to the cross-section form or cross-section size, is adapted to the cross-section of the guiding element. In particular, the guiding element of the container carrier is adapted to the guiding element in such a way that a sliding guiding of the container carrier at the guiding element is achieved. As a result, an exact guiding of the container carrier at the guiding element is achieved.

In a further embodiment, the guiding element is arranged such as to be fixed to the rotor. This fixing of the guiding element to the rotor can be achieved, for example, by a connection, on the upper side and/or underside, of the free end of the guiding element to an element or section of the rotor. This thereby achieves a rigid securing of the guiding element to the rotor.

Preferably, the guiding element has a round or polygonal cross-section, or is configured as a toothed shaft. For example, the guiding element can be configured as tubular. Such embodiments includes those in which the cross-section of the guiding element is round, circular, oval, triangular, rectangular, or polygonal. In the case of a non-circular cross-section, it becomes possible to rotation of the container carrier at the guiding element about its longitudinal axis by having the container carrier surround the guiding element with a positive-fit.

In one exemplary embodiment, a rotation securing arrangement at the container carrier prevents a rotation of the container carrier relative to the guiding element. The result of this is that, despite the use of a guiding element with a circular cross-section, freedom of movement of the container carrier is only permitted in the vertical direction.

Preferably, the electrical coils are provided at the guiding section of the container carrier, i.e. the electrical coils are arranged at the rotor of the electromagnetic linear drive. By the provision of the electrical coils at the guiding section, these coils can be placed in the immediate vicinity of the guiding element to optimize the interaction of the electrical coils with the magnets provided in the guiding element.

In a preferred exemplary embodiment, at least one magnetic field sensor and/or a temperature sensor is provided at the guiding section of the container carrier. By means of the magnetic field sensor, it is possible for the present position of the container carrier at the guiding element to be determined. For example, the at least one magnetic field sensor delivers a sine-cosine signal by means of which a position determination of the container carrier is possible. In addition, by means of the measurement signals provided by the at least one magnetic field sensor, it is possible to monitor for breakage in a container that is to be processed, or, with the configuration of the container-processing machine as a filling machine, for the filling quantity of the filling product filled in the container to be determined. By means of the at least one temperature sensor, the monitoring of the temperature of the electrical coils can be achieved, such that, for example, overload situations or wear of the slide bearings can be identified.

Preferably, the guiding section of the container carrier comprises a plastic layer that surrounds the guiding element on the circumference side and that forms a slide layer in relation to the guiding element. As a result, the sliding guiding of the container carrier at the guiding element, or, respectively, the sliding capability of the container carrier at the guiding element can be improved.

Preferably, the plastic layer surrounds the electrical coils and/or the magnetic field sensor and/or the temperature sensor. In particular, these components are surrounded completely by a plastic layer. By this enclosure of the electrical components in a plastic layer, a high resistance of these electrical components against dirt contamination and the effect of moisture can be achieved.

In a preferred exemplary embodiment, an electrical controller is provided to impose electric current onto the electrical coils such that a raising movement of the container carrier is attained. In particular, the electrical controller is configured for the imposition of alternating current onto the electrical coils, i.e. electric current that changes its direction of flow in a time-dependent manner. Moreover, by means of the electrical controller, current can be imposed on the electrical coils in such a way that an exact positioning of the container carrier at a specific height position at the guiding element can be attained. This can be carried out, in particular, in interaction with the measurement signals provided by the at least one magnetic field sensor. In particular, the at least one magnetic field sensor is connected to the electrical controller for the position detection and position correction of the container carrier. In this situation, in each case, an electrical controller can be provided for each processing station, or one single electrical controller for all the processing stations.

Preferably, by means of a controller coupled to the magnetic field sensor, the contact pressure of the container at the processing station can be detected. In this situation, the magnetic field strength generated by the electrical coils is evaluated in order to determine the contact pressure. This then allows for a further sensor unit to be done without for determining the contact pressure of the container at the processing station.

Further preferred is a controller coupled to the magnetic field sensor for the detection of abrupt changes in the loading of the container carrier. Such abrupt changes in loading can result, for example, from a breakage of a container that is to be processed, such that a container breakage of this kind can be identified automatically and rapidly.

In a preferred exemplary embodiment, a controller coupled to the magnetic field sensor is provided. The controller is configured for the determination of the mass of the container during the container processing. As a result of this, a determination can be made of the filling level of a filling product filled into the container.

In addition, the temperature sensor provided at the container carrier can be connected to a controller for detecting the temperature of the electrical coils.

The invention further relates to a method for the processing of containers by means of a container-processing machine that comprises a rotor driven in a rotating manner and provided at which are a plurality of processing stations. The containers at the container stations are raised and/or lowered by means of a lift. The lift comprises at least one container carrier and a guiding element, at which the container carrier is guided. In this situation, an accommodating space is formed in the interior of the guiding element, in which a plurality of magnets are accommodated. In addition, the container carrier comprises electrical coils, by means of which the container carrier, in interaction with the magnets, is raised or lowered in the guiding element.

In another aspect, the invention features a container-processing machine for processing containers. Such a container-processing machine includes a rotor that rotates about a vertical axis and a plurality of processing stations disposed around the rotor's periphery. Each processing station includes a container carrier, an electromagnetic linear drive, and a lift that raises and lowers the container carrier. The lift has a guiding section and a guided section that are displaceable relative to each other so as to guide the container carrier's motion. The guiding section comprises a tubular guide with an accommodating space that extends through the tubular guide. Within this accommodating space are the magnets. The first and second lift elements, the magnets, and the electrically-conductive coil cooperate to define said electromagnetic linear drive for raising and lowering the container carrier.

As used herein, a "container" refers to a bottle, a can, or any similar container made of a suitable material, including glass, plastic, or metal.

As used herein, "container-processing machine" refers to machines for container processing, including but not limited to filling machines, cleaning machines, inspection machines, closers, and machines for equipping containers with equipment features.

As used herein, "container carrier" refers to any device that is configured for holding and at least partially accommodating a container, including a container plate, on which a container stands upright on its base during container processing, or a suspender that suspends a container by, for example, a neck ring thereof.

The expression "essentially" or "approximately" means deviations from the exact value in each case by ±10%, preferably by ±5%, and/or deviations in the form of changes that are not significant to function.

Further embodiments, advantages, and possible applications of the invention are also derived from the following description of exemplary embodiments and from the figures. In this situation, all the features described and/or pictorially represented are in principle the object of the invention, individually or in any desired combination, regardless of their arrangement in the claims or reference to them. The contents of the claims is also made a constituent part of the description.

BRIEF DESCRIPTION OF THE DRAWINGS

The invention is explained in greater detail hereinafter on the basis of the figures relating to exemplary embodiments. These show.

DETAILED DESCRIPTION

Figure 1:
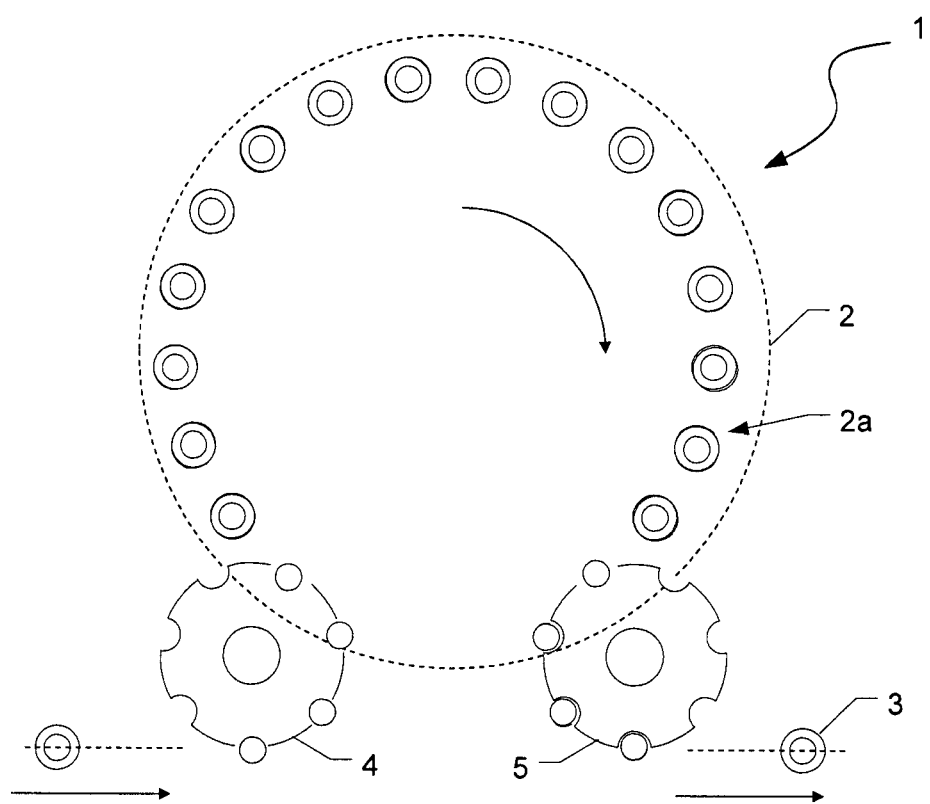
FIG. 1 shows a container-processing machine from above.

FIG. 1 shows a container-processing machine 1 having a rotor 2 that rotates about a vertical machine axis MA and processing stations 2a arranged around the circumferential periphery of the rotor 2. It is at these processing stations 2a that processing of containers 3 delivered to the container-processing machine 1 takes place. A first transfer star 4 delivers unprocessed containers 3 to the rotor 2 while a second transfer star 5 conveys away processed containers 3 away from the rotor 2.

In the illustrated embodiment, the container-processing machine 1 is a filling machine in which the processing stations 2a have filling elements that fill containers with a filling product. As an alternative, the container-processing machine 1 can also be a closing machine. In that case, the processing stations 2a are closing elements that close filled containers.

Each processing station 2a comprises a processing table 2b, that is configured as a plate or carrier arm, and that rotates with the processing station 2a about the machine axis MA. In an alternative embodiment, the processing stations 2a can share a common processing table 2b.

Figure 2:
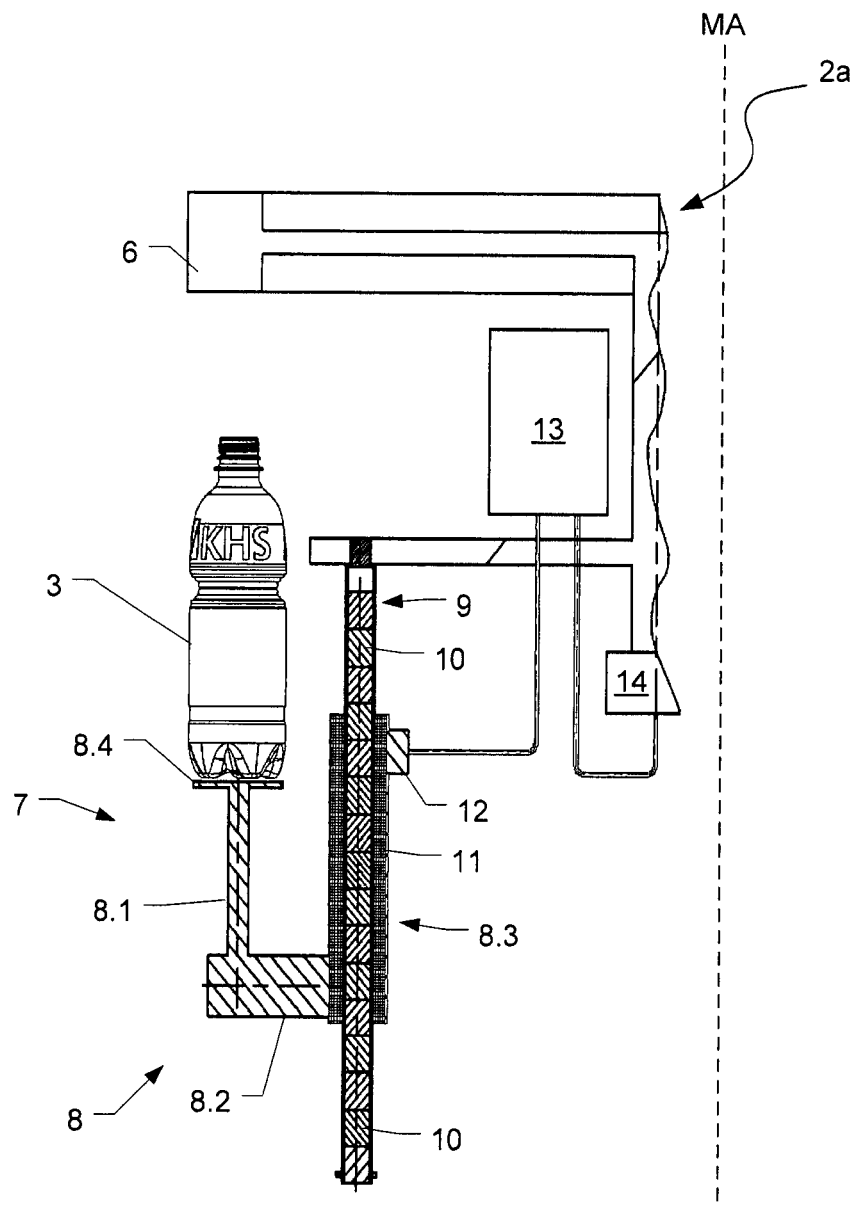
FIG. 2 shows a side view of a processing station of the container-processing machine from FIG. 1.

FIG. 2 shows a processing station 2a having a filling element 6 that is connected to a filling product tank for filling the containers 3 with a liquid filling product. A lift 7 vertically raises a container 3 parallel to the machine axis MA. This lifting action conveys the container 3 to the filling element 6 and pressed the container 3 firmly against the filling element 6. In some embodiments, the lift 7 lifts the container 3 immediately after receiving it.

Processing takes place as the rotor's rotation moves the processing station 2a from the first transfer star 3 to the second transfer star 5. Before the second transfer star 5 takes the container away, the lift 7 lowers the container 3, thus releasing it from its sealing position at the filling element 6.

The lift 7 includes a container carrier 8 that holds the container 3 during container processing. In the exemplary embodiment shown, the container carrier 8 includes a container plate 8.4 on which the container 3 stands upright on its base.

In an alternative embodiment, the container carrier 8 suspends the container 3. It can do so, for example, using a flange formed beneath the container's opening. In this embodiment, the container carriers 8 are tongs and/or are adjusted to the container's diameter in the region of its neck ring or container flange.

In some embodiments, the container carrier 8 holds a container 3 such that its opening lies directly below a filling element's dispensing opening. Among these are embodiments in which a gap separates the container's opening from the filling element. The filling product thus enters the container 3 as a free jet. In other embodiments, there is no gap. The container carrier 8 seals the container 3 against the filling element's dispensing opening.

In the exemplary embodiment, the lift 7 is an electromagnetic linear drive. In this embodiment, the lift 7 includes a tubular guide 9 that vertically slides the container carrier 8 parallel to the machine axis MA. The tubular guide 9 has a continuous cavity extending through it. Among the tubular guides are those that have a round or polygonal cross-section, as well as those having a cross-section that resembles a toothed wheel. In the latter case, the tubular guide 9 is configured as a toothed shaft.

The tubular guide 9 can be held to the rotor 2 at a free end thereof are at both of its free ends. In the exemplary embodiment shown, the tubular guide 9 is fixed at its upper free end to the rotor 2.

The container carrier 8 includes a first container carrier section 8.1, a second container carrier section 8.2, and a third container carrier section 8.3. Overall, the container carrier 8 is a U-shaped, structure in which the first and third container carrier sections 8.1, 8.3 run parallel or essentially parallel to the machine axis MA and the second container carrier section 8.2 connects the first container carrier section 8.1 to the third container carrier section 8.3. The first container carrier section 8.1 forms the container plate 8.4.

The third container carrier section 8.3 has an opening that matches the cross-section of the guide 9 in both its size and shape. As a result, the third container carrier section 8.3 surrounds the circumference of the tubular guide 9. This results in a positive fit. This permits container carrier 8 to be guided by sliding along the tubular guide 9.

When a tubular guide 9 has a circular cross-section, it is possible for the container carrier to rotate as it slides. Some embodiments feature a rotation securing device to inhibit such rotation.

As noted above, the tubular guide 9 has a cavity. This cavity can be used to receive magnets 10. These magnets define a magnet stack with magnets arranged in alternating polarity such that the north pole of one magnet faces the south pole of an adjacent magnet. As a result, field lines from the north pole of one magnet 10 will point in the opposite spatial direction relative to field lines from the north pole of its adjacent magnet 10. The tubular guide 8 and its magnets 10 thus define a stator of an electromagnetic linear drive.

An opening in the tubular guide 9 permits the magnets 10 to be introduced into the tubular guide's cavity. This opening can be provided, for example, on the underside of the tubular guide 9. The opening can be closed, for example, by a rapid closure arrangement or other closure means. In some embodiments, the tubular guide 9 is formed from a hard material that is resistant to water and acid, with good sliding properties. An example of such a material is steel.

The third container carrier section 8.3 includes electrical coils 11 through which alternating current flows. This alternating current generates a magnetic field that interacts with the magnetic field produced by the magnets 10. This interaction causes the lift 7 to slide up or down. Accordingly, the third container carrier section 8.3 functions as a rotor of the electromagnetic linear drive.

The coils 11 are preferably configured in such a way that they generate a magnetic field that is directed transverse to the machine axis MA. Alternate switching of the coils 11 thus permits lifting or lowering of the container carrier 8.

Preferably, the coils 11 in the third carrier container 8.3 are integrated by having been cast into a plastic. This plastic forms a sliding surface against the tubular guide 9. As a result, the plastic surface promotes easier sliding between the container carrier 8 and the tubular guide 9. It also protects the electrical coils 11 against dirt and moisture.

The coils 11 connect to a control system via an electrical connection point 12, such as an electrical plug or screw connection.

In the illustrated embodiment, the control system includes a subordinate controller 13 having an inverter for the electrical actuation of the coils 11. It also includes a monitor to sense the lift's motion. In some embodiments, each processing station 2a has its own separate subordinate controller 13. In other embodiments, one subordinate controller 13 serves all the processing stations 2a, and thus senses motion of all lifts 7 and controls all lifts 7.

A control system can also include a superordinate controller 14 that controls the entire container-processing machine 1. In such embodiments, the subordinate controller 13 connects to the superordinate controller 14. The superordinate controller 14 can thus be viewed as a controller of controllers.

A control system that has both a superordinate controller 14 and subordinate controllers 13 makes it easier to synchronize movement of individual lifts 7 with operation of other functions of the container-processing machine 1. For example, it is possible, by coupling the subordinate controller 13 to the superordinate controller 14, to raise a lift 7 immediately after the first transfer star 4 hands over a container to that lift's processing station 2a. It is also possible, as a result of this coupling, to lower a lift 7 immediately before that lift's processing station 2a hands over a container to the second transfer star 5. This maximizes available time for the container processing, and also minimizes the container-processing machine's loss angle.

In some embodiments, each lift 7 includes a magnetic field sensor that determines the container carrier's position relative to the tubular guide 9. The magnetic field sensor then forwards this information to the subordinate controller 13 or to the superordinate controller 14 for evaluation.

Among these are embodiments in which the magnetic field sensor senses the magnetic field without physical contact. Among those embodiments that have such a sensor are those in which the sensor is in the region of the third container carrier section 8.3. Also among these embodiments are those in which the magnetic field sensor is cast in plastic together with the coils 11. This protects the magnetic field sensor against moisture and dirt.

Some embodiments also have a temperature sensor at the lift 7. This temperature sensor monitors the temperature near the coils 11. Particular embodiments include those in which the temperature sensor is in the vicinity of the third container carrier section 8.3. Among these embodiments are those in which the temperature sensor and the coils 11 have been cast together in plastic. Among the foregoing embodiments are those in which the temperature sensor forwards its measurements to a controller for evaluation. The controller in this case is either the subordinate controller 13 or the superordinate controller 14.

Occasionally, a container 3 will break during container processing. This might happen, for example, if the container is pressed against the filling element 6 with too much force. When a container breaks, pieces typically fall off the container. This causes an abrupt change in the load felt by the container carrier 8.

In some embodiments, the magnetic field sensor senses this abrupt change in loading. In response to detecting evidence of breakage, the container-processing machine causes the container carrier 8 to avoid moving upwards in an uncontrolled manner, and to instead travel back in a controlled manner into its starting position. This permits easy removal of the broken container 3.

The data provided by the magnetic field sensor can be used in a similar manner to control the contact pressure of the container 3 at the filling element 6. For example, as the contact pressure increases, the loading on the carrier 8 will also increase.

The foregoing principle is also applicable to determining how much liquid has been added into a container, and to thereby control the filling process. As filling product enters the container, the total load on the carrier 8 increases. The magnetic field sensor senses the extent of this increase. In order to hold the container 3 in a defined position at the filling element 6 or, respectively, with a defined contact pressure against the filling element 6, it is therefore necessary for the magnetic field to be changed as a function of the force of gravity taking effect on the lift 7.

The control system them compares the measured weight derived from data provided by the magnetic field sensor with a target value. In the event of the measured weight reaches or exceeds this target value, the control system interrupts the filling process.

Accordingly, the magnetic field sensor provides a way to carry out a contact-free filling level measurement. This makes it possible to dispense with flow meters or other devices for determining or deriving fill level. This is particularly desirable since such devices generally contact the product and thus provide opportunities for contamination.

Having described the invention, and a preferred embodiment thereof, what I claim as new, and secured by Letters Patent is:

1. An apparatus comprising a container-processing machine for processing containers, wherein said container-processing machine includes a rotor and a plurality of processing stations, wherein said rotor is configured to rotate about a vertical axis, wherein said processing stations are disposed around a periphery of said rotor, wherein each processing station includes a container carrier, an electromagnetic linear drive, a lift, magnets, and an electrically-conductive coil, wherein said lift comprises said electromagnetic linear drive, wherein said lift raises and lowers said container carrier, wherein said lift comprises a guided section and a guiding section, wherein said guiding section and said guided section are displaceable relative to each other, wherein displacement of said guiding section and said guided section relative to each other guides motion of said container carrier, wherein said guiding section comprises a tubular guide, wherein an accommodating space extends through said tubular guide, wherein said magnets are disposed in said accommodating space, wherein said guiding section, said guided section, said magnets, and said electrically-conductive coil cooperate to define said electromagnetic linear drive for raising and lowering said container carrier.

2. The apparatus of claim 1, wherein said guided section surrounds at least a section of said tubular guide, and wherein, as a result, said tubular guide guides axial motion of said guided section and axial motion of said container carrier.

3. The apparatus of claim 1, wherein said tubular guide is secured to said rotor.

4. The apparatus of claim 1, wherein said guiding section has a circular cross-section.

5. The apparatus of claim 1, wherein said tubular guide has a polygonal cross-section.

6. The apparatus of claim 1, wherein said electrically-conductive coil is provided along said guided section.

7. The apparatus of claim 1, wherein guided section is configured to sense a magnetic field.

8. The apparatus of claim 1, wherein said guided section is configured to sense temperature.

9. The apparatus of claim 1, wherein said electrically-conductive coil is cast into plastic.

10. The apparatus of claim 1, wherein said processing station further comprises a temperature sensor, wherein said guided section comprises a plastic layer that forms a slide layer opposite said tubular guide, and wherein said plastic layer surrounds said temperature sensor.

11. The apparatus of claim 1, wherein said container-processing machine further comprises an electrical controller, wherein said electrical controller is configured to cause electric current to flow through said electrically-conductive coil so as to exert a force that urges said container carrier upward.

12. The apparatus of claim 1, further comprising an electrical controller, wherein said container-processing machine further comprises a magnetic-field sensor that provides, to said electrical controller, information indicative of a position of said container carrier, and wherein, in response, said electrical controller controls current in said electrically-conductive coil so as to correct said position.

13. The apparatus of claim 1, further comprising an electrical controller, wherein said container-processing machine further comprises a magnetic-field sensor that provides, to said electrical controller, information indicative of a contact pressure between said container and said processing station.

14. The apparatus of claim 1, further comprising a controller and a magnetic-field sensor, wherein said controller is configured to receive, from said magnetic-field sensor, information indicative of a loading change on said container carrier, and wherein said controller is further configured to control current flow through said electrically-conductive coil in response to said information.

15. The apparatus of claim 1, further comprising a controller and a magnetic-field sensor, wherein said controller is configured to receive, from said magnetic-field sensor, information indicative of a mass of said container during container processing.

16. The apparatus of claim 1, further comprising a temperature sensor and a controller configured to receive, from said temperature sensor, information indicative of a temperature of said electrically-conductive coil.

17. A method comprising processing containers, wherein processing containers comprises using a container-processing machine that has a rotatable rotor having a periphery along which processing stations are provided, said processing stations each including a lift having a container carrier, a guiding element that comprises a tubular guide, and a guided element, said tubular guide having magnets in an accommodating space formed within said tubular guide, said method comprising causing generation of a magnetic field that interacts with a magnetic field of said magnets in said tubular guide so as to raise said container carrier, wherein causing generation of said magnetic field comprises allowing current to flow through an electrically-conductive coil that is coupled to said guided element.

* * * * *